United States Patent [19]

Paul nee Albertha B. Mitchell et al.

[11] E Re. 29,225

[45] Reissued May 17, 1977

[54] N-SUBSTITUTED DERIVATIVES OF 3-CARBOXAMIDE AND 3-THIOCARBOXAMIDE

[75] Inventors: Albertha M. Paul nee Albertha B. Mitchell, Holliston, Mass.; Charles E. Moppett, Mystic, Conn.

[73] Assignee: The Dow Chemical Company, Midland, Mich.

[22] Filed: Jan. 15, 1976

[21] Appl. No.: 649,173

Related U.S. Patent Documents

Reissue of:

[64] Patent No.: 3,862,187
Issued: Jan. 21, 1975
Appl. No.: 397,180
Filed: Sept. 13, 1973

[52] U.S. Cl. ..... 260/248 NS; 424/249
[51] Int. Cl.[2] ..... C07D 251/72
[58] Field of Search ..... 260/248 NS

[56] References Cited

UNITED STATES PATENTS 3,575,974 4/1971 Hodge et al. ..... 260/248 NS

*Primary Examiner*—John M. Ford

*Attorney, Agent, or Firm*—Theodore Post; C. Kenneth Bjork

[57] ABSTRACT

Compounds of the formula

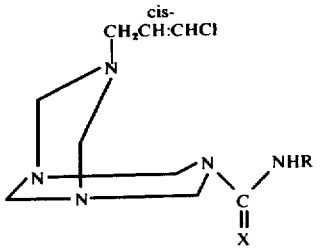

where X represents O or S and R represents lower alkyl, cycloalkyl, phenyl or substituted phenyl wherein the substituents are selected from lower alkyl, lower alkoxy, halo and sulfonyl. The compounds are prepared by reacting the [ carbinolamine ] *ring-opened intermediate*, obtained by reacting cis-1-(3-chloro-2-propenyl)-3,5,7-triaza-1-azoniatricyclo (3,3,1,1$^{3,7}$) decane chloride with excess aqueous sodium hydroxide, with an equivalent amount of a corresponding R isocyanate or R isothiocyanate at a low temperature to give the substituted urea or thiourea product. The compounds have antimicrobial activity.

19 Claims, No Drawings

N-SUBSTITUTED DERIVATIVES OF 3-CARBOXAMIDE AND 3-THIOCARBOXAMIDE

Matter enclosed in heavy brackets [ ] appears in the original patent but forms no part of this reissue specification; matter printed in italics indicates the additions made by reissue.

SUMMARY OF THE INVENTION

This invention concerns novel N-substituted derivatives of 3-carboxamide and 3- [thiocarboxamide] *methanethioamide*-7-cis-(3-chloro-2-propenyl)-1,3,5,7-tetraazabicyclo-(3.3.1) nonane corresponding to the formula

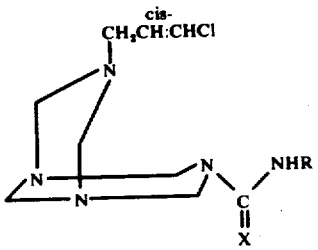

wherein X represents O or S and R represents lower alkyl, 5 to 8 carbon atoms cycloalkyl, phenyl or substituted-phenyl wherein substituents are selected from lower alkyl, lower alkoxy, halo and sulfonyl. The compounds are white, crystalline solids, readily soluble in organic solvents.

In the specification and claims, the term "lower alkyl" designates an alkyl group having from 1, to 2, to 3, to 4 carbon atoms, for example, methyl, ethyl, propyl or butyl; the term "lower alkoxy" designates an alkoxy group having from 1, to 2, to 3, to 4 carbon atoms, for example, methoxy, ethoxy, propoxy or butoxy; and the term "halo" designates chloro or bromo.

The compounds are prepared in a 2-step process wherein cis-1-(3-chloro-2-propenyl)-3,5,7-triaza-1-azoniatricyclo ($3,3,1,1^{3,7}$) decane chloride, commercially available as Dowicil® 200 antimicrobial, is treated with excess aqueous sodium hydroxide to give the [indicated carbinolamine] *ring-opened intermediate*, hereinafter ["Carbinolamine"] "*basic oil*", [according to the following scheme:] *as follows:*

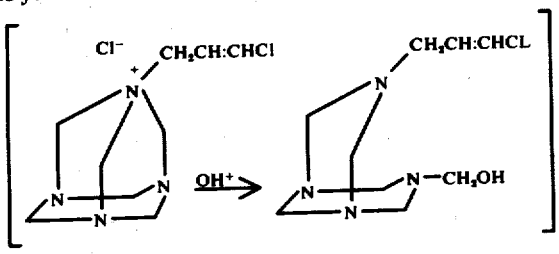

*Dowicil® 200 + NaOH → basic oil*

Excess sodium hydroxide, preferably, 4 molar proportions, is dissolved in water and cooled to room temperature. A quantity of about one mole of Dowicil® 200 antimicrobial is added slowly to the caustic solution and the reaction mixture is stirred approximately 15 minutes at ambient temperature. The [Carbinolamine] *basic oil* which forms is extracted with benzene, the extract is dried over sodium sulfate and the benzene is evaporated to give the [Carbinolamine] *basic oil* in an approximately 78% yield as a viscous oil.

In the second step, the N-substituted derivatives of 3-carboxamide and 3-[thiocarboxamide] *methanethioamide*-7-cis-(3-chloro-2-propenyl)-1,3,5,7-tetraazabicyclo-(3.3.1) nonane, hereinafter referred to as the Compounds or the Compound, are prepared by reacting the [Carbinolamine] *basic oil* with a lower alkyl, a 5 to 8 carbon atom cycloalkyl, a phenyl, or a substituted-phenyl, isocyanate or isothiocyanate according to the following scheme:

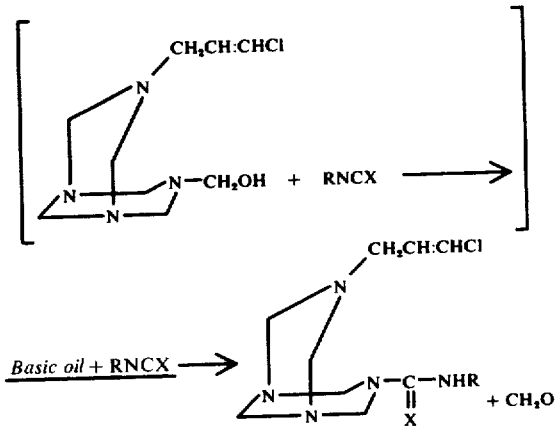

In the equation, X and R have the designation previously given. In [this] *the* second step, an R isocyanate or R isothiocyanate is dissolved in an inert, anhydrous non-nucleophilic solvent such as acetone, ether, benzene, tetrahydrofuran and added to a solution of the [Carbinolamine] *basic oil* in a similar solvent at a low temperature ranging between about minus 15° to plus 5° C. The Compound forms immediately. It is separated by filtration and is identified by elemental analysis and by nuclear magnetic resonance.

[Prior to making the Compounds, it was expected that the corresponding urethane Compounds would be formed. Unexpectedly, it was found that the Carbinolamine loses one mole of formaldehyde and instead the substituted urea and thiourea Compounds are obtained in good yields.]

These urea and thiourea Compounds show increased stability and improved antimicrobial activity as compared with Dowicil® 200 antimicrobial from which the [Carbinolamine] *basic oil* is prepared by reaction with aqueous sodium hydroxide.

DESCRIPTION OF THE PREFERRED EMBODIMENTS

The following examples and teachings additionally describe specific embodiments and the best mode contemplated by the inventors of carrying out the invention.

Example A: Preparation of [Carbinolamine] *Basic Oil* Intermediate

A quantity of 80 g. (2.0 mole) of NaOH was dissolved in 500 ml. water and cooled to room temperature. 100 Grams (0.4 mole) of Dowicil® 200 antimicrobial was added slowly to the caustic solution and the reaction mixture stirred ca. 15 minutes at ambient temperature. Extraction with benzene, drying over $Na_2SO_4$ and evaporation of the benzene gave 72 g. (78% yield) of the [Carbinolamine] *basic oil*, described above, as a viscous oil.

EXAMPLE 1

N-Phenyl-3-Carboxamide-7-Cis(3-Chloro-2-Propenyl)-1,3,5,7-Tetraazabicyclo(3,3,1)Nonane 10.0 Grams (0.043 mole) of the [Carbinolamine] *basic oil* intermediate was dissolved in 50 ml. freshly distilled benzene (benzene distilled from calcium hydride) and filtered through Celite®. 4.88 Grams (0.04 mol.) phenyl isocyanate (freshly distilled) was dissolved in 50 ml. of dry benzene and added to the [Carbinolamine] *basic oil* solution at 5° C. A copious, white precipitate formed immediately as the flask rapidly warmed to room temperature. The product was easily isolated by filtration to give 10.3 g. (75% yield). NMR and elemental analysis indicated the titular compound had been prepared, m.p. 150–151° C.

| | % Theory | Found |
|---|---|---|
| C | 56.38 | 56.07 |
| H | 6.32 | 6.23 |
| N | 21.24 | 21.80 |
| Cl | 11.01 | 10.9 |
| O | 5.05 | 4.98 |

EXAMPLE 2

N-Phenyl-3-[Thiocarboxamide] *Methanethioamide*-7-Cis-(3-Chloro-2-Propenyl)-1,3,5,7-Tetraazabicyclo(3,3,1)Nonane A quantity of 10.0 g. (0.043 mole) of the [Carbinolamine] *basic oil* was dissolved in ether, filtered through Celite® and cooled to minus 15° C. 5.54 Grams (0.041 mole) phenyl isothiocyanate was dissolved in ether, cooled to minus 10° C. and added to the cold [Carbinolamine] *basic oil* solution. The initial product was an oil, but white powdery crystals were obtained after 96 hours standing; yield 13 g. (95%). NMR and elemental analysis indicated the titular product had been obtained. It melted at 105–107° C.

| | % Theory | Found |
|---|---|---|
| C | 53.41 | 53.45 |
| H | 5.93 | 5.72 |
| N | 20.77 | 20.73 |
| Cl | 10.38 | 10.6 |
| S | 9.49 | 9.64 |

EXAMPLE 3

The following Compounds were prepared by substituting the corresponding isocyanate or isothiocyanate in the procedure of Example 1 or Example 2.

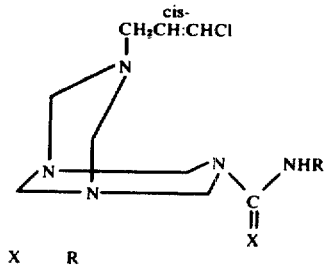

| | X | R | m.p., ° C. |
|---|---|---|---|
| a) | O | p-$CH_3OC_6H_4$ | 134–136 |
| b) | O | p-$CH_3C_6H_4$ | 139–141 |
| c) | O | 2,5-$(CH_3)_2C_6H_3$ | 138–140 |
| d) | O | p-$ClC_6H_4$ | 122–125 |
| e) | O | p-$BrC_6H_4$ | 134–136 |
| f) | O | 2,5-$Cl_2C_6H_3$ | 100–102 |
| g) | O | 3,4-$Cl_2C_6H_3$ | 115–117 |
| h) | O | cyclohexyl | 128–130 |
| i) | O | p-$CH_3.C_6H_4.SO_2$ | 105–107 |
| j) | S | 4-$ClC_6H_4$ | 95–96 |
| k) | S | 4-$BrC_6H_4$ | 112–115 |
| l) | S | 3,4-$Cl_2C_6H_3$ | 102–104 |
| m) | S | 3,4-$(CH_3)_2C_6H_3$ | 62–63 |
| n) | O | n-$CH_3(CH_2)_3$ | 25 |
| o) | S | n-$CH_3(CH_2)_3$ | 98–100 |

The Compounds of the invention are useful as antimicrobials for the control of bacteria and fungi. This is not to suggest that the Compounds and their mixtures are equally effective against all such organisms at the same concentration. For such uses the Compounds or their mixtures can be employed in an unmodified form or dispersed [on a finely divided solid and employed as dusts. Such mixtures can also be dispersed] in water with the aid of a surface-active agent and the resulting emulsions employed as sprays. In other procedures, the products can be employed as active constituents in solvent solutions, oil-in-water or water-in-oil emulsions, including cosmetic emulsions. The augmented compositions are adapted to be formulated as concentrates and subsequently diluted with additional liquid or solid adjuvant to product the ultimate treating compositions. Good results are obtained when employing compositions containing antimicrobial concentrations and usually from about 100 to about 1,000 parts by weight of one or more of the Compounds per million parts of such compositions.

Incorporation of the Compounds of this invention into materials which are subject to bacterial and/or fungal attack inhibits the growth of such microbes and preserves the original value of the materials. The Compounds are sufficiently volatile and water-insoluble that they will persist on or in such materials for long periods of time. Examples of materials which are adversely effected by fungal growth are latex paint films, wood and wooden products. The inventive compounds are sufficiently active against fungi that only small quantities are required to prevent mildew on paint films or wood rot. The compounds are therefore useful for long-term protection against fungal growth in or on materials having a wood basis or a protective or decorative paint film subject to fungal attack.

In representative operations, the products of the invention when tested for antimicrobial activity using conventional agar dilution tests gave complete growth inhibition against the following organisms at the indicated concentrations in parts per million:

| Minimum Inhibitory Concentration, p.p.m. | | | | | | | | |
|---|---|---|---|---|---|---|---|---|
| Compound of Example | Sa | St | Aa | Pa | Cp | Sc | An | Pen |
| 1 | 50 | 25 | 50 | 50 | 250 | 250 | 500 | 250 |
| 2 | 75 | 25 | 50 | 75 | >500 | 250 | 250 | 500 |
| 3 a) | 50 | 10 | 75 | 75 | 250 | 250 | 500 | 250 |
| 3 b) | 50 | 25 | 50 | 50 | 250 | 250 | 250 | 100 |
| 3 c) | 75 | 50 | 75 | 75 | 250 | 250 | 500 | 250 |
| 3 d) | 75 | 25 | 75 | 100 | 250 | 250 | 500 | 250 |
| 3 e) | 100 | 25 | 100 | 250 | 250 | 250 | 500 | 250 |
| 3 f) | 75 | 50 | 75 | 100 | 250 | 250 | 500 | 250 |
| 3 g) | 50 | 25 | 250 | 250 | 250 | 250 | 500 | 250 |
| 3 h) | 75 | 25 | 50 | 50 | 250 | 250 | 500 | 250 |
| 3 i) | 250 | 50 | 250 | 500 | 500 | 500 | >500 | 500 |
| 3 j) | 75 | 50 | 75 | 100 | 250 | 250 | 250 | 100 |
| 3 k) | 250 | 75 | 100 | 250 | 250 | 500 | 500 | 250 |
| 3 l) | 50 | 75 | 100 | 100 | 250 | 250 | 250 | 100 |
| 3 m) | 50 | 50 | 75 | 100 | 250 | 250 | 250 | 100 |
| 3 n) | 50 | 25 | 50 | 75 | 250 | 250 | 250 | 250 |
| 3 o) | 100 | 75 | 100 | 250 | >500 | 500 | 500 | 500 |
| Cis* | 50 | 25 | 50 | 75 | 500 | 250 | >500 | 500 |

*Dowicil® 200 antimicrobial
Sa = S. aureus
St = S. typhosa
Aa = A. aerogenes
Pa = P. aeruginosa
Cp = C. pelliculosa
Sc = S. cerevisiae
An = A. niger
Pen = P. chrysogenum

What is claimed is:

1. A compound corresponding to the formula

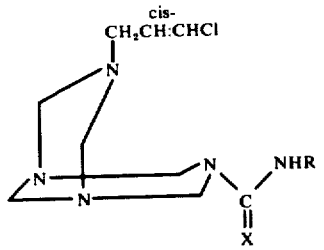

wherein X represents O or S and R represents lower alkyl, 5 to 8 carbon atom cycloalkyl, phenyl or substituted-phenyl having lower alkyl, lower alkoxy, halo or sulfonyl substitution.

2. The compound of claim 1 wherein X represents O and R represents phenyl.

3. The compound of claim 1 wherein X represents S and R represents phenyl.

4. The compound of claim 1 wherein X represents O and R represents 4-methoxyphenyl.

5. The compound of claim 1 wherein X represents O and R represents 4-methylphenyl.

6. The compound of claim 1 wherein X represents O and R represents 2,5-dimethylphenyl.

7. The compound of claim 1 wherein X represents O and R represents 4-chlorophenyl.

8. The compound of claim 1 wherein X represents O and R represents 4-bromophenyl.

9. The compound of claim 1 wherein X represents O and R represents 2,5-dichlorophenyl.

10. The compound of claim 1 wherein X represents O and R represents 3,4-dichlorophenyl.

11. The compound of claim 1 wherein X represents O and R represents cyclohexyl.

12. The compound of claim 1 wherein X represents O and R represents 4-tolylsulfonyl.

13. The compound of claim 1 wherein X represents S and R represents 4-chlorophenyl.

14. The compound of claim 1 wherein X represents S and R represents 4-bromophenyl.

15. The compound of claim 1 wherein X represents S and R represents 3,4-dichlorophenyl.

16. The compound of claim 1 wherein X represents S and R represents 3,4-dimethylphenyl.

17. The compound of claim 1 wherein X represents O and R represents n-butyl.

18. The compound of claim 1 wherein X represents S and R represents n-butyl.

19. Method for making (a) a 7-cis(3-chloro-2-propenyl)-N-substituted-1,3,5,7-tetraazabicyclo(3.3.1)-nonane-3-carboxamide or (b) a 7-(3-chloro-2-propenyl)-N-substituted-1,3,5,7-tetraazabicyclo(3.3.1)nonane-3-thiocarboxamide which comprises adding (a) a substantially equimolar proportion of an R isocyanate in an organic solvent or (b) a substantially equimolar proportion of an R isothiocyanate in an organic solvent to an organic solvent solution of [3-hydroxymethyl-7-(3-chloro-2-propenyl)-1,3,5,7-tetraazabicyclo(3,3,1)nonane] *the reaction product of Dowicil® 200 with excess aqueous sodium hydroxide* at a reaction temperature between about minus 15 and about 5° C., wherein R represents lower alkyl, 5 to 8 carbon atom cycloalkyl, phenyl or substituted-phenyl wherein the substituents are selected from lower alkyl, lower alkoxy, halo and sulfonyl, and recovering the said product.

* * * * *

UNITED STATES PATENT AND TRADEMARK OFFICE

CERTIFICATE OF CORRECTION

PATENT NO. : Re. 29,225

DATED : May 17, 1977

INVENTOR(S) : Albertha M. Paul nee Albertha B. Mitchell, et al.

It is certified that error appears in the above-identified patent and that said Letters Patent are hereby corrected as shown below:

First page, [54], the title should read --N-SUBSTITUTED DERIVATIVES OF 3-CARBOXAMIDE AND 3-METHANETHIOAMIDE-7-(3--CHLORO-2-PROPENYL)-1,3,5,7-TETRAAZABICYCLO-(3.3.1) NONANE AND PREPARATION - II--.

Column 1, line 30, "atoms" should read --atom--.

Column 1, lines 50-60, the scheme should have been deleted.

Column 4, line 52, "volatile" should read -- non-volatile --.

Signed and Sealed this

*Twenty-third* Day of *May 1978*

[SEAL]

*Attest:*

RUTH C. MASON
*Attesting Officer*

LUTRELLE F. PARKER
*Acting Commissioner of Patents and Trademarks*